US008242182B2

(12) United States Patent
Cooper et al.

(10) Patent No.: US 8,242,182 B2
(45) **Date of Patent: *Aug. 14, 2012**

(54) POROUS BODIES AND METHOD OF PRODUCTION THEREOF

(75) Inventors: Andrew Ian Cooper, Liverpool (GB); David John Duncalf, Wirral (GB); Alison Jayne Foster, Wirral (GB); Steven Paul Rannard, Wirral (GB); Haifei Zhang, Liverpool (GB)

(73) Assignee: IOTA NanoSolutions Limited, London (GB)

( * ) Notice: Subject to any disclaimer, the term of this patent is extended or adjusted under 35 U.S.C. 154(b) by 318 days.

This patent is subject to a terminal disclaimer.

(21) Appl. No.: 10/587,732

(22) PCT Filed: Jan. 28, 2005

(86) PCT No.: PCT/GB2005/000311

§ 371 (c)(1), (2), (4) Date: May 17, 2007

(87) PCT Pub. No.: WO2005/073300

PCT Pub. Date: Aug. 11, 2005

(65) Prior Publication Data

US 2008/0221231 A1 Sep. 11, 2008

(30) Foreign Application Priority Data

Jan. 28, 2004 (GB) .................................. 0401947.7
Jan. 28, 2004 (GB) .................................. 0401950.1

(51) Int. Cl.
*C08J 9/28* (2006.01)
*C08J 9/00* (2006.01)

(52) U.S. Cl. ............................ 521/64; 521/141; 521/61

(58) Field of Classification Search .................. 521/141, 521/61, 64

See application file for complete search history.

(56) References Cited

U.S. PATENT DOCUMENTS

| | | | | |
|---|---|---|---|---|
| 3,551,522 | A | 12/1970 | Miles et al. | |
| 3,551,533 | A * | 12/1970 | Monforte et al. | 264/14 |
| 4,178,695 | A * | 12/1979 | Erbeia | 34/295 |
| 4,888,420 | A * | 12/1989 | Steiner et al. | 536/64 |
| 4,983,730 | A | 1/1991 | Domeshek et al. | |
| 5,025,004 | A * | 6/1991 | Wu et al. | 514/165 |
| 5,723,508 | A | 3/1998 | Healy et al. | |
| 6,048,908 | A * | 4/2000 | Kitagawa | 521/56 |
| 2003/0215502 | A1* | 11/2003 | Pruss et al. | 424/465 |

FOREIGN PATENT DOCUMENTS

| | | | |
|---|---|---|---|
| JP | 55082621 | | 6/1980 |
| JP | 1989-01011141 | * | 1/1989 |
| WO | 99/00187 | | 1/1999 |
| WO | 01/19345 | | 3/2001 |
| WO | 01/25393 | | 4/2001 |
| WO | 03/091321 | | 11/2003 |
| WO | 2004/011537 | | 2/2004 |
| WO | 2005/014704 | | 2/2005 |

OTHER PUBLICATIONS

Material Safety Data Sheet for Calcium Stearat, as published by Science Lab.com, Oct. 11, 2005, p. 3.*

Material Safety Data Sheet for Polyoxyethylene (20) Sorbitan Tristearate, JECFA, 1981, p. 1.*

International Search Report, PCT/GB2005/000311, mailed May 24, 2005, 3 pp.

JP 01 011141 A (Nippl Koraagen Kogyo KK), Jan. 13, 1989, Patents of Japan, vol. 013, No. 182, Abstract.

* cited by examiner

*Primary Examiner* — Randy Gulakowski
*Assistant Examiner* — Kara Boyle
(74) *Attorney, Agent, or Firm* — Michael Best & Friedrich LLP

(57) ABSTRACT

The invention provides a method for preparing water dispersible or water soluble porous bodies and the bodies themselves The bodies have an intrusion volume as measured by mercury porosimetry of at least about 3 ml/g and comprise a three dimensional open-cell lattice containing less than 10% by weight of a water soluble polymeric material and 5 to 90% by weight of a surfactant, with the proviso that said porous bodies are not spherical beads having an average bead diameter of 0.2 to 5 mm. The method comprises the steps of: a) providing an intimate mixture of the polymeric material and the surfactant in a liquid medium b) providing a fluid freezing medium at a temperature effective for rapidly freezing the liquid medium; c) cooling the liquid medium with the fluid freezing medium at a temperature below the freezing point of the liquid medium for a period effective to rapidly freeze the liquid medium; and d) freeze-drying the frozen liquid medium to form the porous bodies by removal of the liquid medium by sublimation.

17 Claims, No Drawings

POROUS BODIES AND METHOD OF PRODUCTION THEREOF

TECHNICAL FIELD

The present invention relates to water soluble or dispersible porous bodies and to methods of producing such porous bodies.

BACKGROUND TO THE INVENTION

Certain surfactants, including, for example, the >C8 primary alkyl sulphate ('PAS') surfactants having utility in detergent compositions, are difficult to dissolve in water at low temperatures. This may be due to the surfactant forming a viscous phase on contact with water and this phase can act as a mixing barrier, hindering further dissolution of surfactant. It may also be that the crystalline form of surfactant is very stable at low temperatures. While it would be advantageous, for environmental reasons, to be able to use PAS and certain other surfactants for laundering, and even more advantageous if this could be done at low temperatures, the dissolution kinetics of PAS have precluded its widespread use in low temperature washing.

Our co-pending international patent application PCT/GB03/03226 describes the formation of porous beads comprising a three dimensional open-cell lattice of a water-soluble polymeric material with an average bead diameter in the range 0.2 to 5 mm. These are typically 'templated' materials formed by the removal of a non-aqueous dispersed phase from a high internal phase emulsion. The beads are freeze-dried to remove the bulk of the aqueous phase. This leaves a 'skeletal' form of the emulsion behind. The beads dissolve rapidly in water and have the remarkable property that a water insoluble component dispersed in the emulsion prior to drying can also be dispersed in water on solution of the beads. Surfactant is present as an emulsifier.

BRIEF DESCRIPTION OF THE INVENTION

We have now determined that effectively polymer-free systems, i.e. which comprise a surfactant but little or no polymer can provide highly porous bodies which disperse rapidly on contact with water, even at low temperatures.

In accordance with a first aspect of the invention, there is provided water dispersible or water soluble porous bodies comprising a three dimensional open-cell lattice containing:

(a) less than 10% by weight of water-soluble polymeric material other than a surfactant, and (b) 5 to 95% by weight of a surfactant, said porous bodies having an intrusion volume as measured by mercury porosimetry (as hereinafter described) of at least about 3 ml/g These porous bodies are particularly advantageous especially when they contain a relatively high level of surfactant as this promotes rapid dissolution of the surfactant and dispersion of any optional water insoluble material for which the surfactant is a carrier.

The present invention also provides a method for the preparation of said porous bodies which comprises the steps of:

(I) cooling an emulsion of:
 a) An aqueous phase comprising the surfactant, and,
 b) An immiscible second phase, to a temperature at which the continuous phase becomes solid, and (II) subsequently removing the bulk of the continuous and dispersed phases.

The cooled emulsion retains its structure when the bulk of the phases are removed (preferably by freeze drying) leaving a solid, surfactant-containing lattice. This lattice retains its structure provided that the ambient temperature does not rise above its melting point. The lattice so produced is characterised by a large surface area, which greatly assists the solution of its components. This improved solution rate is particularly beneficial when the surfactant is being used for delicate cleaning tasks such as for cleaning delicate fabrics or where only cold water is available for use in the cleaning process.

DETAILED DESCRIPTION OF THE INVENTION

In order that the present invention may be better understood and carried forth into practice, it is described below with reference to various preferred features and particular embodiments.

Surfactant:

It is preferred that a substantial part of the structuring of the bodies, i.e. the lattice, is provided by the surfactant. Consequently, the surfactant is preferably a solid per-se at temperatures encountered during product storage, i.e. at temperature below 30 Celsius, preferably at temperatures below 40 Celcius. In the alternative, the surfactant may form a solid over an appropriate temperature range in the presence of other materials present in the composition, such as builder salts.

The surfactant may be non-ionic, anionic, cationic, or zwitterionic.

Examples of suitable non-ionic surfactants include ethoxylated triglycerides; fatty alcohol ethoxylates; alkylphenol ethoxylates; fatty acid ethoxylates; fatty amide ethoxylates; fatty amine ethoxylates; sorbitan alkanoates; ethylated sorbitan alkanoates; alkyl ethoxylates; Pluronics™; alkyl polyglucosides; stearol ethoxylates; alkyl polyglycosides.

Examples of suitable anionic surfactants include alkylether sulfates; alkylether carboxylates; alkylbenzene sulfonates; alkylether phosphates; dialkyl sulfosuccinates; alkyl sulfonates; soaps; alkyl sulfates; alkyl carboxylates; alkyl phosphates; paraffin sulfonates; secondary n-alkane sulfonates; alpha-olefin sulfonates; isethionate sulfonates.

Examples of suitable cationic surfactants include fatty amine salts; fatty diamine salts; quaternary ammonium compounds; phosphonium surfactants; sulfonium surfactants; sulfonxonium surfactants.

Examples of suitable zwitterionic surfactants include N-alkyl derivatives of amino acids (such as glycine, betaine, aminopropionic acid); imidazoline surfactants; amine oxides; amidobetaines. Mixtures of surfactants may be used.

The preferred surfactants are primary and secondary alcohol sulphates containing greater than C8 chain length, more preferably, the materials known commercially as 'cocoPAS'.

Product Form:

The bulk density of the porous bodies is preferably in the range of from about 0.01 to about 0.2 g/$cm^3$ more preferably from about 0.02 to about 0.09 g/$cm^3$, and most preferably from about 0.03 to about 0.08 g/$cm^3$.

The intrusion volume of the porous bodies as measured by mercury porosimetry (as hereinafter described) is at least about 3 ml/g, more preferably at least about 4 ml/g, even more preferably at least about 5 ml/g, and most preferably at least about 6 ml/g. For example, the intrusion volume may be from about 3 ml/g to about 30 ml/g, preferably from about 4 ml/g to about 25 ml/g, more preferably from about 10 ml/g to about 20 ml/g.

Intrusion volume provides a very good measure (in materials of this general type) of the total pore volume within the porous bodies of the present invention.

The porous bodies may be in the form of powders, beads or moulded bodies. Powders may be prepared by the disintegration of porous bodies in the form of beads or disintegration of bodies during other stages of the production process.

Porous Bodies as Carriers:

The porous bodies of the present invention optionally include within the lattice hydrophobic materials to be dispersed when the bodies are dispersed in an aqueous medium. Dispersion into an aqueous medium of such hydrophobic materials is much improved.

The hydrophobic materials may be incorporated into the lattice by dissolving them in the discontinuous oil phase of an oil-in-water emulsion from which the lattice is made.

The present invention also includes, in a further aspect, solutions or dispersions comprising surfactant and a hydrophobic material formed by exposing to an aqueous medium porous bodies according to the present invention, wherein said bodies comprise the hydrophobic material.

There are many instances in personal care products such as deodorants, skin and hair cleaning or care products or in household products such as laundry cleaning and care products or household cleaning or care products for hard and soft surfaces where it is desirable to administer hydrophobic materials in an aqueous environment. Because of the hydrophobic nature of these materials they are often reluctant to disperse in an aqueous environment. The use of the porous bodies of the present invention facilitates this dispersion and in many cases enables hydrophobic materials to be dispersed more effectively than previously.

It may be required to disperse the hydrophobic materials at the point where the product is being used. In this case the porous bodies of the present invention will be contained in the product until it is used by exposing it to an aqueous environment, at which time the water-soluble/dispersible lattice of the porous body will break down releasing the hydrophobic material.

The porous bodies of the present invention may be used to introduce hydrophobic materials into products, for example, liquid products during the manufacture of the products. In this case the lattice of the porous bodies of the present invention will break down when the porous bodies contact an aqueous environment during manufacture releasing the hydrophobic material in a form in which it can be more readily incorporated into the product being manufactured.

The porous bodies of the present invention may be used to transport materials to sites where they can be incorporated into products. By converting liquid products into porous bodies the need to transport large amounts of liquids can be avoided resulting in significant cost savings and safer transport of materials which are potentially hazardous when transported in a liquid form. Materials which would be potentially unstable if stored or transported in liquid form may be incorporated into the porous bodies of the present invention and stored or transported with less risk of degradation.

The incorporation of potentially unstable hydrophobic materials, for example vaccines, vitamins or perfumes, into the porous bodies of the present invention may protect them from degradation during storage prior to use.

Some specific examples of products in which the porous bodies of the present invention may be used are given below. These are given as examples only and are not intended to limit the applicability of the present invention. Those skilled in the art will however realise that the porous bodies of the present invention will have utility in other areas not specifically exemplified herein.

Hydrophobic materials that are released from the porous bodies of the present invention at the time of use may include: — antimicrobial agents, for example: triclosan, climbazole, octapyrox, ketoconizole, phthalimoperoxyhexanoic acid (PAP), quaternary ammonium compounds, colloidal silver, zinc oxide.

antidandruff agent for example: zinc pyrithione skin lightening agents for example 4-ethylresorcinol fluorescing agents for example: 2,5-bis(2-benzoxazolyl) thiophene for use on fabrics (such as cotton, nylon, polycotton or polyester) in laundry products skin conditioning agents, for example cholesterol antifoaming agents for example isoparrafin hair conditioning agents for example quaternary ammonium compounds, protein hydrolysates, peptides, ceramides and hydrophobic conditioning oils for example hydrocarbon oils such as paraffin oils and/or mineral oils, fatty esters such as mono-, di-, and triglycerides, silicone oils such as polydimethylsiloxanes (e.g. dimethicone) and mixtures thereof fabric conditioning agents for example quaternary ammonium compounds having 1 to 3, preferably 2 optionally substituted (C8-C24) alk(en)yl chains attached to the nitrogen atom by one or more ester groups; hydrophobic monoparticles such as a sucrose polyester for example sucrose tetra-tallowate; silicones for example polydimethylsiloxane thickening agents for example hydrophobically modified cellulose ethers such as modified hydroxyethylcelluloses dyes for example dyes intended to change the colour of fabrics, fibres, skin or hair.

UV protecting agents such as sunscreens for example octyl methoxycinnamate (Parsol MCX), butyl methoxydibenzoylmethane (Parsol 1789) and benzophenone-3 (Uvinul M-40), ferulic acid.

bleach or bleach precursors for example 6-N-phthalimidoperoxyhexanoic acid (PAP) or photobleaching compounds. Dispersing the bleach from the porous bodies of the present invention results in the bleach being more finely dispersed and reduces the spot damage seen when larger particles of the bleach contact a fabric antioxidants for example hydrophobic vitamins such as vitamin E, retinol, antioxiants based on hydroxytoluene such as Irganox or commercially available antioxidants such as the Trollox series.

insecticides, pesticides, herbicides that are stored as solid compositions before use but which are made up into liquid for spraying onto animals or crops perfumes or flavourings or precursors thereto pharmaceutically or veterinary active materials. There is a need for pharmaceutical compositions which can be taken by the consumer without the need to ingest the composition with a drink such as water. These compositions interact with the moisture in the oral cavity to release the active ingredient which is then ingested by the consumer. By incorporating the pharmaceutically or veterinary active molecule in the porous bodies of the present invention, pharmaceutical compositions which meet this need can be prepared.

In a similar way to that described above pharmaceutical and veterinary active ingredients may be formulated so that they release the active material into the nasal, occular, pulmonary or rectal cavities or on the skin where they may act topically or they may be absorbed transdermally to act systemically By using the appropriate polymeric material in the lattice of the porous bodies of the present invention, porous bodies can be made that remain intact until the conditions (for example temperature or pH) change to those under which dispersion can occur. Thus dispersion can be delayed until a certain temperature has been reached or until the pH has changed to a suitable value such as would occur as the porous bodies pass down the GI tract. The acidity in the GI tract reduces down the GI tract and porous bodies which disperse hydrophobic actives only when the porous bodies are exposed to higher pH conditions enable pharmaceutically or veterinary active materials to be released only in the intestine having passed through the stomach intact.

Examples of situations where the porous bodies of the present invention are used to incorporate a hydrophobic material into a product during the manufacture of that product include: — the introduction of hydrophobic materials such as fluorescers; enzymes; bleaches; hydrophobic polymers for example hydrophobically modified polyacrylates, silicones, hydrophobically modified polyvinylpyrrolidone, sulpha alkyl polysaccharides, Jaguar and JR polymers; fatty alcohols or acids; dyes for example shading dyes or black dyes for colour recovery into laundry products.

the use of porous bodies according to the present invention containing hydrophobic dyes in the manufacture of water soluble inkjet compositions.

the introduction of porous bodies containing different hydrophobic materials enables a manufacturer to produce a single base formulation into which the desired hydrophobic materials may be introduced by the use of the appropriate porous body of the present invention.

the use of porous bodies containing hydrophobic polymers which disperse into water as the lattice breaks down to form a latex. The use of such latexes containing appropriate hydrophobic polymers deposited onto fabric imparts crease resistance or easy-iron properties to the fabric.

The porous bodies of the present invention may include within the lattice, water soluble materials which will be dispersed when the bodies are dispersed in an aqueous medium. The water soluble materials may be incorporated into the lattice by dissolving them in the liquid medium from which they are made.

Examples of suitable water soluble materials include:—

Water soluble vitamins such as vitamin C;

water soluble fluorescers such as the 4,4'-bis(sulfo-styryl) biphenyl disodium salt (sold under the trade name Tinopal CBS-X;

activated aluminium chlorohydrate;

transition metal complexes used as bleaching catalysts;

water soluble polymers such as polyesters isophthalic acid), gerol, xanthan gum, or polyacrylates; diethylenetriaminepentaacetic acid (DTPA);

or mixtures thereof.

The porous bodies of the present invention may include within the lattice, materials which will be dispersed as very small particles when the polymeric bodies are dispersed in an aqueous medium. These materials may be incorporated into the lattice by dissolving or dispersing them in the liquid medium from which the porous bodies are made. If the particles are less than 1 micron, preferably less than 0.5 micron and they are incorporated into skincare products then the particles will not be felt by the user as the dispersed porous bodies are applied to the skin.

Water Soluble Polymers:

Preferably the porous bodies of the present invention contain less than 5% wt more preferably less than 3% by weight of water-soluble polymeric material.

When present, the polymeric material is a material that would be considered as "water soluble" by those skilled in the art i.e. if it forms a homogeneous solution in water. Water soluble polymers generally possess pendant polar or ionizable groups (e.g. —C═O, —OH, —N($R_1$)($R_2$) in which $R_1$ and $R_2$, which may be the same or different, are independently H or (C1 to C4)alkyl, —N($R_3$)($R_4$)($R_5$)$^+$ in which $R_3$, $R_4$ and $R_5$ which may be the same or different, are independently H or (C1 to C4)alkyl, —CON($R_6$)($R_7$) in which $R_6$ and $R_7$, which may be the same or different, are H or (C1 to C4) alkyl, —$CH_2CH_2O$—, —$CO_2H$ or salts thereof, —$SO_3H$ or salts thereof groups) on a backbone chain which may be hydrophobic.

If water-soluble polymeric materials are incorporated into the porous bodies of the present invention, the time taken for the bodies to dissolve or disperse may be significantly reduced. For detergent applications, the nature of the lattice should be such that the dissolution or dispersion of the bodies preferably occurs in less than three minutes, more preferably less than two minutes, most preferably less than one minute.

Examples of water soluble polymeric materials include: —

(a) natural polymers (for example naturally occurring gums such as guar gum or locust bean gum or a polysaccharide such as dextran or cellulose;

(b) cellulose derivatives for example xanthan gum, xyloglucan, cellulose acetate, methylcellulose, methyethylcellulose, hydroxyethylcellulose, hydroxyethylmethylcellulose, hydroxy-propylcellulose, hydroxypropylmethylcellulose (HPMC), hydroxy-propylbutylcellulose, ethylhydroxyethylcellulose, carboxy-methylcellulose and its salts (eg the sodium salt—SCMC), or carboxymethylhydroxyethylcellulose and its salts (for example the sodium salt);

(c) homopolymers of any one of the monomers listed in Table 1 below;

d) copolymers prepared from two or more monomers listed in Table 1 below;

(e) mixtures thereof

TABLE 1

| |
|---|
| vinyl alcohol, |
| acrylic acid, |
| methacrylic acid |
| acrylamide, |
| methacrylamide |
| acrylamide methylpropane sulphonates |
| aminoalkylacrylates |
| aminoalkylmethacrylates |
| hydroxyethylacrylate |
| hydroxyethylmethylacrylate |
| vinyl pyrrolidone |
| vinyl imidazole |
| vinyl amines |
| vinyl pyridine |
| ethyleneglycol |
| ethylene oxide |
| ethyleneimine |
| styrenesulphonates |
| ethyleneglycolacrylates |
| ethyleneglycol methacrylate |

When the polymeric material is a copolymer it may be a statistical copolymer (heretofore also known as a random copolymer), a block copolymer, a graft copolymer or a hyper-branched copolymer. Comonomers other than those listed in Table 1 may also be included in addition to those listed if their presence does not destroy the water soluble or water dispersible nature of the resulting polymeric material.

Examples of suitable homopolymers include polyvinylalcohol, polyacrylic acid, polymethacrylic acid, polyacrylamides (such as poly-N-isopropylacrylamide), polymethacrylamide; polyacrylamines, polymethylacrylamines, (such as polydimethylaminoethyl-methacrylate and poly-N-morpholinoethylmethacrylate, polyvinyl-pyrrolidone, polyvinylimidazole, polyvinylpyridine, polyethylene-imine and ethoxylated derivatives thereof.

Method of Preparation:

As noted above, one method suitable for preparing the porous bodies comprises the steps of: cooling a surfactant-containing oil-and-water emulsion to a temperature at which the continuous phase becomes solid, and subsequently removing the bulk of the continuous and dispersed phases.

Accordingly a further aspect of the present invention, there is provided a method the preparation of water dispersible or water soluble porous bodies comprising a three dimensional open-cell lattice containing:

(a) less than 10% by weight of a water soluble polymeric material and (b) 5 to 90% by weight of a surfactant, said porous bodies having an intrusion volume as measured by mercury porosimetry (as herein described) of at least about 3 ml/g with the proviso that said porous body is not a spherical bead having an average bead diameter of 0.2 to 5 mm comprising the steps of:

a) providing an intimate mixture of the surfactant in a liquid medium b) providing a fluid freezing medium at a temperature effective for rapidly freezing the liquid medium;

c) cooling the liquid medium with the fluid freezing medium at a temperature below the freezing point of the liquid medium for a period effective to rapidly freeze the liquid medium; and (d) freeze-drying the frozen liquid medium to form the bodies by removal of the liquid medium by sublimation.

The intimate mixture of the surfactant in the liquid medium may be an oil-in-water emulsion comprising a continuous aqueous phase containing the polymeric material, a discontinuous oil phase and the surfactant.

When the porous body is to be in the form of a powder the cooling of the liquid medium may be accomplished by spraying the liquid medium in atomised form into the fluid freezing medium.

When the porous body is to be in the form of beads the cooling of the liquid medium may be accomplished by dropping drops of the liquid medium into the fluid freezing medium.

Porous bodies in the form of moulded bodies may be made by pouring the liquid medium into a mould and cooling the liquid medium by the fluid freezing medium. In a preferred process of the invention to make moulded bodies, the liquid medium is poured into a pre-cooled mould surrounded by fluid freezing medium.

The frozen liquid medium may be freeze-dried by exposing the frozen liquid medium to high vacuum. The conditions to be used will be well known to those skilled in the art and the vacuum to be applied and the time taken should be such that all the frozen liquid medium present has been removed by sublimation.

In the case of moulded porous bodies freeze-drying may take place with the frozen liquid medium still in the mould. Alternatively, the frozen liquid medium may be removed from the mould and subsequently freeze-dried.

The freeze-drying step may be performed for up to around 72 hours in order to obtain the porous bodies of the present invention.

The above process preferably uses an oil-in-water emulsion comprising a continuous aqueous phase and a discontinuous oil phase. The surfactant usefully acts as an emulsifier for the emulsion.

Surfactants suitable for use as emulsifiers in oil-in-water emulsions preferably have an HLB value in the range 8 to 18. It is preferred that the surfactant is present in the liquid medium in a concentration of about 1% to about 60% by weight. More preferably, the surfactant is present in the liquid medium in a concentration of about 2% to about 40% by weight and a yet more preferred concentration is about 5% to about 25% by weight.

The discontinuous oil phase of the oil-in-water emulsion preferably comprises a material which is immiscible with the continuous phase, which freezes at a temperature above the temperature which is effective for rapidly freezing the aqueous medium and which is removable by sublimation during the freeze drying stage.

The discontinuous oil phase of the emulsion may be selected from one or more from the following group of organic solvents:

alkanes, such as heptane, n-hexane, isooctane, dodecane, decane;

cyclic hydrocarbons, such as toluene, xylene, cyclohexane;

halogenated alkanes, such as dichloromethane, dichoroethane, trichloromethane (chloroform), fluorotrichloromethane and tetrachloroethane;

esters such as ethyl acetate;

ketones such as 2-butanone;

ethers such as diethyl ether;

volatile cyclic silicones such as cyclomethicone;

and mixtures thereof.

Preferably, the organic solvent comprises from about 10% to about 95% v/v of the emulsion, more preferably from about 20% to about 60% v/v. A preferred solvent is cyclohexane as the freezing point of cyclohexane is higher than that of water and the specific heat capacity for cyclohexane is much lower than that of water. This induces rapid freezing of the emulsion.

Preferably, the fluid medium is at a temperature below the freezing point of all of the components and is preferably at a much lower temperature to facilitate rapid freezing. The fluid freezing medium is preferably a liquified substance which is a gas or vapour at standard temperature and pressure. The liquified fluid freezing medium may be at its boiling point during the freezing of the liquid medium or it may be cooled to below its boiling point by external cooling means. The fluid freezing medium may be selected from one or more of the following group; liquid air, liquid nitrogen (b.p. −196° C.), liquid ammonia (b.p. −33° C.), liquified noble gas such as argon, liquefied halogenated hydrocarbon such as trichloroethylene, chlorofluorocarbons such as Freon®, hexane, dimethylbutene, isoheptane or cumene. Mixtures of organic liquids and solid carbon dioxide may also be used as the fluid freezing medium. Examples of suitable mixtures include chloroform or acetone and solid carbon dioxide (−77° C. and diethyl ether and solid carbon dioxide (−100° C.).

The fluid medium is removed during freeze drying, preferably under vacuum and is preferably captured for reuse. Due to the very low boiling temperature, inertness, ease of expulsion and economy, liquid nitrogen is the preferred fluid freezing medium.

The emulsions are typically prepared under conditions which are well known to those skilled in the art, for example, by using a magnetic stirring bar, a homogenizer, or a rotator mechanical stirrer.

The porous polymeric bodies produced usually comprise of two types of pores. One is from the sublimation of solid ice. The other kind of pore structure results from the sublimation of the oil phase.

The method for producing porous bodies according to the present invention, will now be more particularly described, by way of example only, with reference to the accompanying Examples.

EXAMPLES

In the Examples that follow the dissolution time is measured as using a weighed sample of the polymeric bodies, which was stirred gently with water until the stirred mixture was clear to the eye. The time at which the mixture became clear to the eye was recorded as the dissolution time.

The freeze-drier used was an Edwards Supermodulyo. This was operated with an average vacuum of 0.2 mbar and at −50° C.

Example 1

Hydrophilic Surfactant 1 g of sodium dodecyl sulfate (SDS) was dissolved in 5 ml of water. To this aqueous solution was added 0.5 mg of oil red in 5 ml cyclohexane with vigorous stirring (using a RW11 Basic IKA paddle stirrer). The emulsion formed was sprayed into liquid nitrogen using a trigger spray and the resulting frozen powder was freeze-dried to form a powder. The powder was highly porous, rapidly dissolving and dispersed the hydrophobic dye quickly into water to form a clear red 'solution'

Example 2

Hydrophobic Surfactant

An experiment was conducted in order to produce highly porous, rapidly dissolving oil-soluble powders that disperse a hydrophilic dye quickly into oil.

0.2 g of sodium dioctyl sulfosuccinate was dissolved in 4 ml of toluene. To this organic solution was added 0.01 g of direct yellow 50 in 4 ml of water with vigorous stirring (as described in the previous example). The emulsion formed was sprayed into liquid nitrogen using a trigger spray and the resulting frozen powder was freeze-dried to form a powder. This powder dissolved readily into acetone to form a clear 'yellow' solution.

Example 3

Dissolution of cocoPAS

A 12.5% wt aqueous solution of sodium lauryl sulfate (cocoPAS, EMAL 10PHD, ex Kao) was prepared by adding cocoPAS to deionised water. A sample of the solution (4 ml) was stirred with a type RW11 Basic IKA paddle stirrer and cyclohexane (6 ml) was added to form an emulsion having 75% v/v of discontinuous phase.

The beaker containing the emulsion was frozen in liquid nitrogen.

Once frozen, the emulsion was placed in a freeze-drier overnight. The same solution was made into beads by dripping the emulsion into liquid nitrogen, or made into a powder by spraying the emulsion into liquid nitrogen. Once frozen, the emulsion was placed in a freeze-drier overnight as before.

10 mg of beads (or monolith, or powder) were added to 2 ml water, and stirred at 250 rpm. Using a stopwatch, the time to form a clear solution was determined. Results are given in the table below:

TABLE 2

Dissolution of CocoPAS

| Material | Dissolution at 5 ° C. | Dissolution at 20 ° C. |
|---|---|---|
| Na cocoPAS as received | >2 min - not fully dissolved | 1 min |
| Monolith | 2 min 10 sec | 30 sec |
| Beads | 2 min | 20 sec |
| Powder | 35 sec | 30 sec |

It can be seen that the dissolution time of the cocoPAS was significantly improved by forming it into the porous bodies of the present invention.

Example 4

CocoPAS Plus Fluorescer 9 g of CocoPAS (sodium lauryl sulphate, EMAL 10PHD, ex Kao) was dissolved in 120 ml of water. To this aqueous solution was added 11.0 g of Tinopal™ SOP in 120 ml of dichloromethane with vigorous stirring. The emulsion formed was sprayed into liquid nitrogen using a trigger spray and the resulting frozen powder was freeze-dried to form a powder.

A sample was also made containing 30% wt loading of the fluorescer, i.e. 1 g Tinopal and 2.3 g of cocoPAS with 40 ml water and 40 ml dichloromethane.

Both samples dissolved quickly into water to give clear 'solutions'.

Example 5

CocoPAS Plus Fluorescer in Products

Samples of the 10% and 30% loaded bodies, prepared as disclosed in Example 4 were added to Brilhante (ex Gessy Lever, 2004) base formulation, without any fluorescer present. This was done in proprortions to give final products with 0.05, 0.1 and 0.2% wt in the final formulation. The change in Ganz whiteness (Delta G) on cloth monitors, before and after washing, was compared with that obtained with two control formulations:

a) Brilhante base with the addition of 0.1 wt % fluorescer on product, added by dissolution into ethanol—the 'ideal situation'.
b) Brilhante base with the addition of 0.1 wt % fluorescer on product, dispersed in nonionic surfactant.

Measurements were performed for cotton, nylon and polyester. Results are shown in table 3 below:

TABLE 3

| Ex. | Loading | % wt on prod. | carrier | Delta G Cotton | Delta G Nylon | Delta G Polyester |
|---|---|---|---|---|---|---|
| Con. 1 | — | 0.1 | Ethanol | 21.94 | 38.15 | 8.88 |
| Con. 2 | — | 0.1 | Nonionic | 2.95 | 8.89 | 1.74 |
| 5a | 10% | 0.05 | CocoPAS | 18.34 | 26.08 | 6.90 |
| 5b | 10% | 0.1 | CocoPAS | 21.68 | 33.35 | 9.11 |

TABLE 3-continued

| Ex. | Loading | % wt on prod. | carrier | Delta G Cotton | Delta G Nylon | Delta G Polyester |
|---|---|---|---|---|---|---|
| 5c | 10% | 0.2 | CocoPAS | 27.09 | 36.59 | 10.47 |
| 5d | 30% | 0.05 | CocoPAS | 12.86 | 22.27 | 6.83 |
| 5e | 30% | 0.1 | CocoPAS | 19.69 | 30.34 | 8.97 |
| 5f | 30% | 0.2 | CocoPAS | 24.99 | 36.02 | 10.46 |

From the table it can be seen that the method of the invention gives deposition of fluorescer which is comparable with dosage of fluorescer in ethanol.

The invention claimed is:

1. Water-soluble porous bodies comprising a three dimensional, oil-in-water emulsion-templated, freeze-dried, open-cell lattice, from which the bulk of the water and oil have been removed comprising:

(a) less than 10% by weight of water-soluble polymeric material other than a surfactant, said water-soluble polymeric material forming a homogeneous solution in water;

(b) about 5 to 95% by weight of a surfactant; and, (c) a water-insoluble material incorporated into said lattice to be dispersed when the water-soluble porous body dissolves;

said porous bodies having an intrusion volume as measured by mercury porosimetry of at least about 3 ml/g, and comprise two types of pores: one from the sublimation of solid ice of the continuous aqueous phase and one from the sublimation of the solid oil of the discontinuous phase;

wherein said porous bodies are powders having a particle size below about 0.2 mm or moulded bodies having a particle size above about 5 mm;

with the proviso that said porous bodies are not spherical beads having an average bead diameter of 0.2-5.0 mm;

wherein said water-soluble polymeric material is a water-soluble natural gum, a water-soluble polysaccharide, a water-soluble cellulose derivative or a water-soluble homopolymer or copolymer comprising (co)monomers selected from the group consisting of:

vinyl alcohol,
acrylic acid,
methacrylic acid
acrylamide,
methacrylamide
acrylamide methylpropane sulphonates
aminoalkylacrylates
aminoalkylmethacrylates
hydroxyethylacrylate
hydroxyethylmethylacrylate
vinyl pyrrolidone
vinyl imidazole
vinyl amines
vinyl pyridine
ethyleneglycol
ethylene oxide
ethyleneimine
styrenesulphonates
ethyleneglycolacrylates
ethyleneglycol methacrylate; and
mixtures thereof.

2. A method of preparing water-soluble porous bodies comprising a three dimensional, oil-in-water emulsion-templated, freeze-dried open-cell lattice comprising:

(a) less than about 10% by weight of a water-soluble polymeric material other than a surfactant; said water-insoluble polymeric material forming a homogeneous solution in water;

(b) about 5 to 90% by weight of a surfactant, and (c) a water-insoluble material incorporated into said lattice to be dispersed when the water-soluble porous body dissolves;

said porous bodies having an intrusion volume as measured by mercury porosimetry of at least about 3 ml/g;

wherein said porous bodies are powders having a particle size below about 0.2 mm or moulded bodies having a particle size above 5 mm; and with the proviso that said porous bodies are not spherical beads having an average bead diameter of about 0.2-5.0 mm;

comprising the successive steps of:

a) providing an oil-in-water emulsion comprising the water-soluble polymeric material, the water-insoluble material in a discontinuous oil phase and the surfactant, wherein the aqueous phase and the oil phase together form a liquid medium, and the discontinuous phase of the emulsion comprises about 10 to about 95% by volume of the emulsion;

b) providing a fluid freezing medium at a temperature effective for rapidly freezing the liquid medium;

c) cooling the liquid medium with the fluid freezing medium at a temperature below the freezing point of the liquid medium for a period effective to rapidly freeze the liquid medium; and d) freeze-drying the frozen liquid medium to form the porous bodies by removal of the bulk of the liquid medium by sublimation, such that said porous bodies comprise two types of pores: one from the sublimation of solid ice and one from the sublimation of the solid oil of the discontinuous oil phase.

3. Porous bodies as claimed in claim 1, wherein the water-soluble cellulose derivative is selected from the group consisting of xanthan gum, xyloglucan, cellulose acetate, methylcellulose, methyethylcellulose, hydroxyethyl-cellulose, hydroxyethylmethylcellulose, hydroxyl-propylcellulose, hydroxypropylmethylcellulose (HPMC), hydroxypropylbutylcellulose, ethylhydroxyethylcellulose, carboxymethylcellulose and its salts, or carboxymethyl-hydroxyethylcellulose and its salts.

4. Porous bodies as claimed in claim 1 wherein the surfactant is non-ionic, anionic, cationic, or zwitterionic.

5. Porous bodies as claimed in claim 1 wherein the surfactant is solid at ambient temperature.

6. Porous bodies as claimed in claim 1 wherein the surfactant is selected from the group consisting of ethoxylated triglycerides; fatty alcohol ethoxylates; alkylphenol ethoxylates; fatty acid ethoxylates; fatty amide ethoxylates; fatty amine ethoxylates; sorbitan alkanoates; ethylated sorbitan alkanoates; alkyl ethoxylates; pluronics; alkyl polyglucosides; stearol ethoxylates; alkyl polyglycosides; alkylether sulfates; alkylether carboxylates; alkylbenzene sulfonates; alkylether phosphates; dialkyl sulfosuccinates; alkyl sulfonates; soaps; alkyl sulfates; alkyl carboxylates; alkyl phosphates; paraffin sulfonates; secondary n-alkane sulfonates; alpha-olefin sulfonates; isethionate sulfonates; fatty amine salts; fatty diamine salts; quaternary ammonium compounds; phosphonium surfactants; sulfonium surfactants; sulfonxonium surfactants; N-alkyl derivatives of amino acids; imidazoline surfactants; amine oxides; amidobetaines; and mixtures thereof.

7. Porous bodies as claimed in claim 1 wherein the porous polymeric bodies have water-soluble material incorporated into the polymeric lattice; wherein the water soluble material is selected from the group consisting of water soluble vitamins; water soluble fluorescers; activated aluminium chlorohydrate; transition metal complexes used as bleaching catalysts; water soluble polymers; diethylenetriaminepentaacetic acid (DTPA); primary and secondary alcohol sulphates containing greater than C8 chain length; or mixtures thereof.

8. Water soluble porous polymeric bodies as claimed in claim 1 wherein the water-insoluble material is selected from the group consisting of antimicrobial agents; antidandruff agent; skin lightening agents; fluorescing agents; antifoams; hair conditioning agents; fabric conditioning agents; skin conditioning agents; dyes; UV protecting agents; bleach or bleach precursors; antioxidants; insecticides; pesticides; herbicides; perfumes or precursors thereto; flavourings or precursors thereto; pharmaceutically active materials; hydrophobic polymeric materials; and mixtures thereof.

9. A method as claimed in claim 2 wherein the cooling of the liquid medium is accomplished by spraying an atomised emulsion into the fluid freezing medium; by dropping drops of the emulsion into the fluid freezing medium or by pouring the emulsion into a mould and cooling the emulsion in the mould.

10. A method as claimed in claim 2 wherein the water-soluble polymeric material is a water-soluble natural gum, a water-soluble polysaccharide, a water-soluble cellulose derivative or a water-soluble homopolymer or copolymer comprising (co)monomers selected from the group consisting of:

vinyl alcohol,
acrylic acid,
methacrylic acid
acrylamide,
methacrylamide
acrylamide methylpropane sulphonates
aminoalkylacrylates
aminoalkylmethacrylates
hydroxyethylacrylate
hydroxyethylmethylacrylate
vinyl pyrrolidone
vinyl imidazole
vinyl amines
vinyl pyridine
ethyleneglycol
ethylene oxide
ethyleneimine
styrenesulphonates
ethyleneglycolacrylates
ethyleneglycol methacrylate; and
mixtures thereof.

11. A method as claimed in claim 2 wherein the surfactant is non-ionic, anionic, cationic, or zwitterionic.

12. A method as claimed in claim 2 wherein the surfactant is solid at ambient temperature.

13. A method as claimed in claim 2 wherein the surfactant has an HLB value of 8 to 18.

14. A method as claimed in claim 2 wherein the surfactant is selected from the group consisting of ethoxylated triglycerides; fatty alcohol ethoxylates; alkylphenol ethoxylates; fatty acid ethoxylates; fatty amide ethoxylates; fatty amine ethoxylates; sorbitan alkanoates; ethylated sorbitan alkanoates; alkyl ethoxylates; pluronics; alkyl polyglucosides; stearol ethoxylates; alkyl polyglycosides; alkylether sulfates; alkylether carboxylates; alkylbenzene sulfonates; alkylether phosphates; dialkyl sulfosuccinates; alkyl sulfonates; soaps; alkyl sulfates; alkyl carboxylates; alkyl phosphates; paraffin sulfonates; secondary n-alkane sulfonates; alpha-olefin sulfonates; isethionate sulfonates; fatty amine salts; fatty diamine salts; quaternary ammonium compounds; phosphonium surfactants; sulfonium surfactants; sulfonxonium surfactants; N-alkyl derivatives of amino acids (such as glycine, betaine, aminopropionic acid); imidazoline surfactants; amine oxides; amidobetaines; and mixtures thereof.

15. A method as claimed in claim 2 wherein the discontinuous phase of the emulsion comprises 20 to 60% by volume of the emulsion.

16. A method as claimed in claim 2 wherein the discontinuous phase of the emulsion is selected from the group consisting of alkanes; cyclic hydrocarbons; halogenated alkanes; esters; ketones; ethers; volatile cyclic silicones and mixtures thereof.

17. Solutions or dispersions comprising water-soluble polymeric materials and surfactant formed by exposing the water-soluble porous bodies of claim 2 to an aqueous medium.

* * * * *